US010970892B2

(12) United States Patent
Tanaka (10) Patent No.: US 10,970,892 B2
(45) Date of Patent: Apr. 6, 2021

(54) ELECTRONIC APPARATUS FOR DRAWING FIGURE BASED ON FUNCTION DATA STORED IN ADVANCE OR BASED ON DRAWING DATA RECEIVED FROM SERVER DEPENDING ON TYPE OF FIGURE TO BE DRAWN, AND INFORMATION PROCESSING METHOD, SYSTEM, AND MEDIUM FOR SAME

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 12 days.

(21) Appl. No.: 16/376,276

(22) Filed: Apr. 5, 2019

(65) Prior Publication Data
US 2019/0318516 A1    Oct. 17, 2019

(30) Foreign Application Priority Data

Apr. 17, 2018    (JP) .............................. JP2018-079446

(51) Int. Cl.
*G06T 11/20* (2006.01)
*G06F 17/12* (2006.01)
*G09G 5/36* (2006.01)

(52) U.S. Cl.
CPC ............ *G06T 11/206* (2013.01); *G06F 17/12* (2013.01); *G09G 5/363* (2013.01); *G09G 2370/022* (2013.01)

(58) Field of Classification Search
None
See application file for complete search history.

(56) References Cited

U.S. PATENT DOCUMENTS

2014/0285528 A1* 9/2014 Yoshizawa ................ G06T 3/00
345/676
2016/0077901 A1* 3/2016 Roth ....................... H04L 67/42
719/328

OTHER PUBLICATIONS

"Desmos User Guide" (Year: 2018).*
Desomos, desmos User Guide, translated by Horikawa, Y., Retrieved on Apr. 16, 2018 (https://desmos.s3.amazonaws.com/Desmos_User_Guide_JA.pdf).

* cited by examiner

*Primary Examiner* — Vu Nguyen
(74) *Attorney, Agent, or Firm* — Holtz, Holtz & Volek PC (57) ABSTRACT

An electronic apparatus includes a memory, a display, and a processor. The processor obtains an instruction on a figure-related process. If a type of a figure indicated by the instruction is a type unable to be drawn with function data stored in the memory, the processor: sends relevant data to at least one server; receives, from the server, drawing data generated by the server executing, based on the relevant data, an arithmetic operation required for the figure-related process; and performs the process on the display in accordance with the drawing data. If the type is a type able to be drawn with the function data, the processor executes an arithmetic operation required for the figure-related process using the function data without requesting the server to execute the arithmetic operation, and performs the process on the display in accordance with drawing data generated as a result of the arithmetic operation.

20 Claims, 7 Drawing Sheets

ELECTRONIC APPARATUS FOR DRAWING FIGURE BASED ON FUNCTION DATA STORED IN ADVANCE OR BASED ON DRAWING DATA RECEIVED FROM SERVER DEPENDING ON TYPE OF FIGURE TO BE DRAWN, AND INFORMATION PROCESSING METHOD, SYSTEM, AND MEDIUM FOR SAME

CROSS-REFERENCE TO RELATED APPLICATIONS

This application is based upon and claims the benefit of priority from the prior Japanese Patent Application No. 2018-079446, filed on Apr. 17, 2018, the entire contents of which are incorporated herein by reference.

BACKGROUND OF THE INVENTION

1. Field of the Invention

The present invention relates to an electronic apparatus, an information processing method, a system, and a medium.

2. Description of the Related Art

There are known graph drawing applications usable on web browsers. For example, there is disclosed in a non-patent literature (Desmos, desmos User Guide, translated by HORIKAWA, Y., retrieved Apr. 16, 2018, from https://desmos.s3.amazonaws.com/Desmos_User_Guide JA.pdf) an application which runs on a web browser(s) for executing arithmetic operations on the basis of mathematical expressions input by a user(s) into an expression list, and drawing graphs on the web browser on the basis of results of the arithmetic operations.

SUMMARY OF THE INVENTION

This type of technology is requested to run smoothly. Advantages of the present invention include providing the technology which runs smoothly.

According to an aspect of the present invention, there is provided an electronic apparatus which communicates with at least one server, including:
a memory which stores function data for figure drawing;
a display; and
a processor which:
obtains an instruction on a figure-related process;
if a type of a figure indicated by the obtained instruction is a type unable to be drawn with the function data stored in the memory, (i) sends relevant data including information on the figure to the at least one server, (ii) receives, from the at least one server, drawing data generated by the at least one server executing, based on the relevant data, an arithmetic operation required for the figure-related process, and (iii) performs the figure-related process on the display in accordance with the received drawing data without executing the arithmetic operation required for the figure-related process using the function data; and
if the type of the figure indicated by the obtained instruction is a type able to be drawn with the function data stored in the memory, (i) executes an arithmetic operation required for the figure-related process using the function data without requesting the at least one server to execute the arithmetic operation required for the figure-related process, and (ii) performs the figure-related process on the display in accordance with drawing data generated as a result of the arithmetic operation.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention, wherein.

DETAILED DESCRIPTION OF THE PREFERRED EMBODIMENTS

Hereinafter, one or more embodiments of the present invention will be described with reference to the drawings. The embodiments relate to applications which utilize the Web, and are used, for example, in school education. The applications of the embodiments are especially used in mathematics education.

[Configuration of System]

Figure 1:
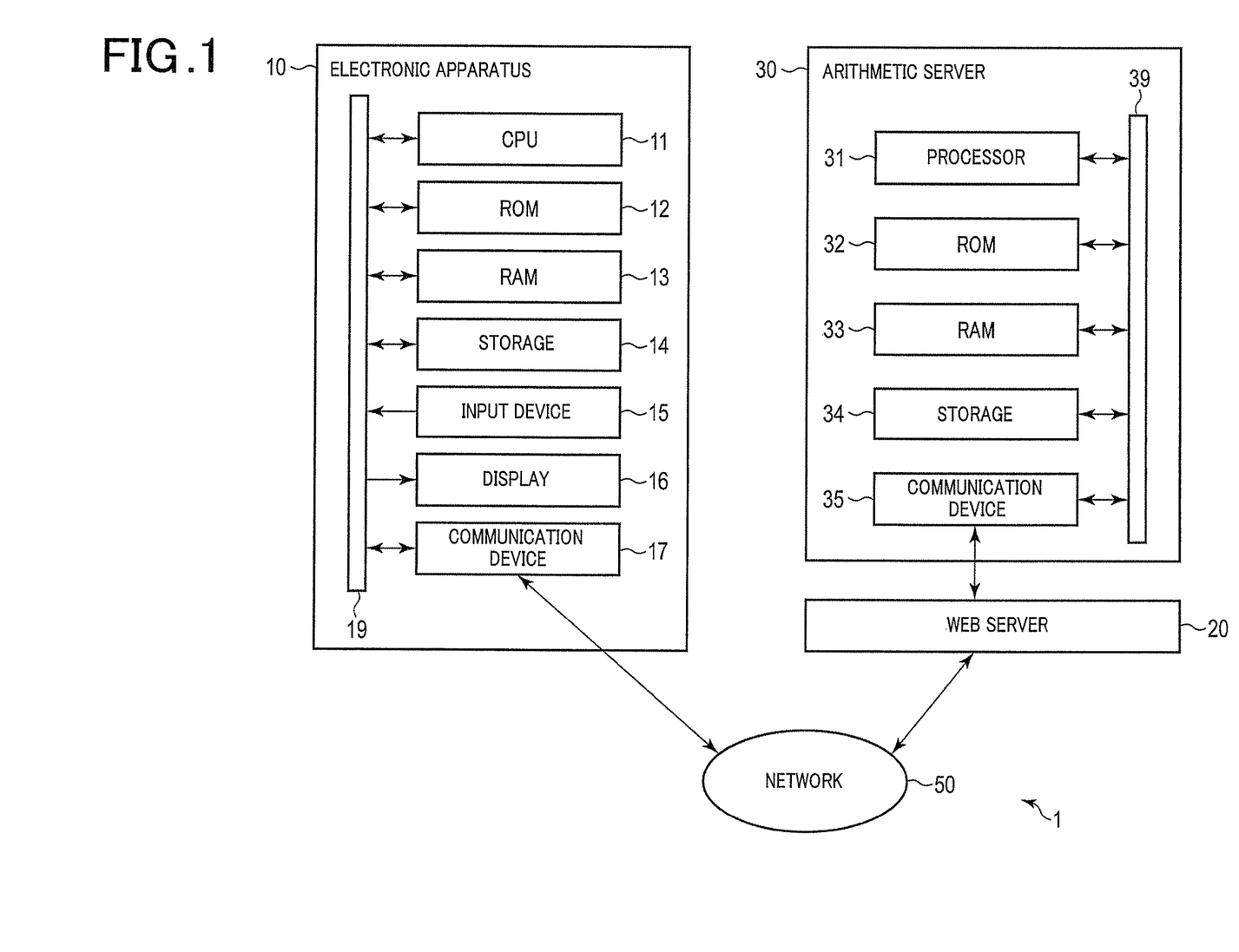
FIG. 1 is a block diagram schematically showing an example of configuration of a system according to an embodiment(s)

FIG. 1 is a diagram schematically showing an example of configuration of a system 1 according to an embodiment (s). The system 1 includes an electronic apparatus 10 as a client, a web server 20, and an arithmetic server 30. The electronic apparatus 10 is any type of electronic apparatus, which includes a personal computer (PC), a tablet information terminal, and a smartphone. On each of such electronic apparatuses, a web browser runs. Using the web browser, each electronic apparatus accesses the web server 20 connected to the arithmetic server 30 via a network 50, such as the Internet, and executes web applications. Hence, in the embodiment, the electronic apparatus 10 performs display in accordance with a program(s) as a web application(s). The programs, which are web applications, may be stored in a read only memory (ROM) of the web server 20, or may be stored in a memory of a computer other than the web server 20. In the latter case, the computer, where the programs are stored, connects with the electronic apparatus 10 via the network 50.

FIG. 1 shows one electronic apparatus 10, but any number of electronic apparatuses may be included in the system 1. Any number of electronic apparatuses may execute web applications.

As shown in FIG. 1, the electronic apparatus 10 includes a central processing unit (CPU) 11, a read only memory (ROM) 12, a random access memory (RAM) 13, a storage 14, an input device 15, a display 16, and a communication device 17 which connect with one another via a bus line 19. The CPU 11 performs various types of signal processing and so forth. Instead of or in addition to the CPU 11, any type of integrated circuit, such as an application-specific integrated circuit (ASIC), a field-programmable gate array (FPGA), or a graphics processing unit (GPU), may be used. That is, the electronic apparatus 10 may use any type of processor. The ROM 12 stores a startup program and so forth. The RAM 13 functions as a main storage device for the CPU 11. As the RAM 13, for example, a dynamic RAM (DRAM) or a static RAM (SRAM) is used. As the storage 14, for example, a hard disk drive (HDD), a solid-state drive (SSD), or an embedded MultiMediaCard (eMMC) is used. The storage 14 stores programs and various types of information, such as parameters, used by the CPU 11. The RAM 13 and the storage 14 are not limited to the above respective examples, and each may be replaced by any type of storage device. The input device 15 is, for example, a keyboard, a mouse, and/or a touchscreen. The display 16 is, for example, a liquid crystal display or an organic EL display. The communication device 17 is used to communicate with apparatuses external to the electronic apparatus 10. The communication device 17 connects to the network 50, such as the Internet.

On the web server 20, a backend server for web applications exists. The web server 20 is in charge of processes which are necessary to execute web applications. Behind the web server 20, the arithmetic server 30 which executes arithmetic operations of various functions exists. An arithmetic engine of the arithmetic server 30 is accessible by the backend server of the web server 20 only, and cannot be accessed directly from the outside, so that the arithmetic engine is concealed.

As shown in FIG. 1, the arithmetic server 30 is an information processing apparatus, and includes a processor 31, a ROM 32, a RAM 33, a storage 34, and a communication device 35 which connect with one another via a bus line 39. The processor 31 performs various types of signal processing and so forth. The ROM 32 stores information used in operation of the processor 31. The RAM 33 functions as a main storage device for the processor 31. As the storage 34, any type of storage medium may be used. The storage 34 stores programs and various types of information, such as parameters, used by the processor 31.

Figure 6A:
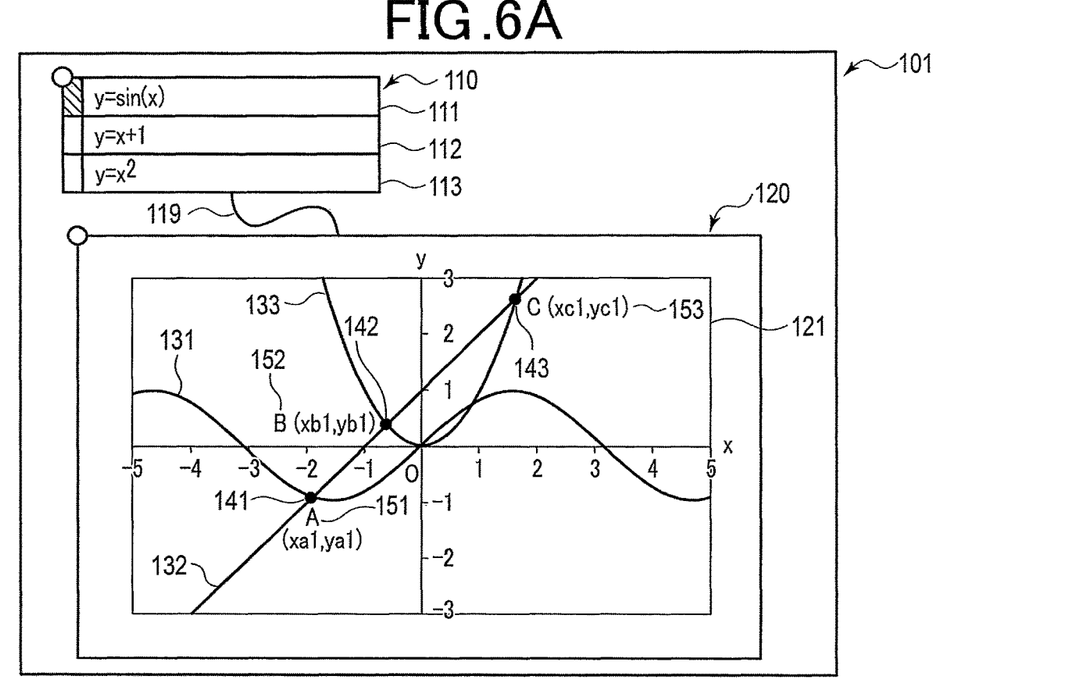
FIG. 6A shows an example of a screen relevant to a graph tag and displayed on the electronic apparatus.
Figure 6B:
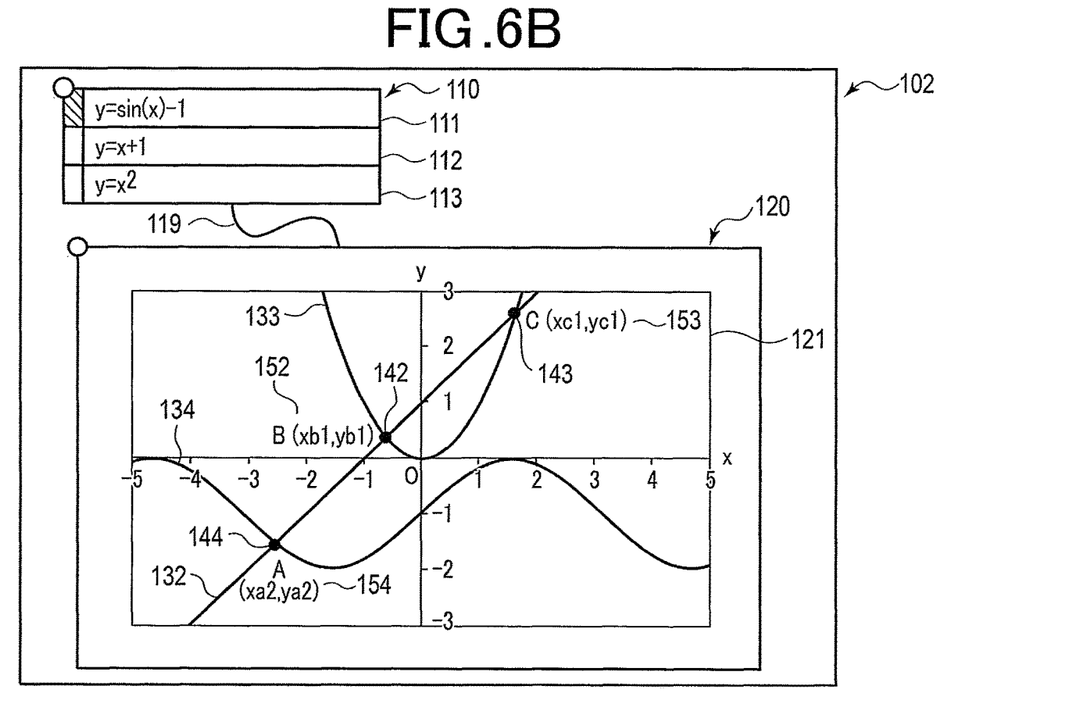
FIG. 6B shows an example of a screen relevant to the graph tag and displayed on the electronic apparatus.

In the embodiment, input and display are performed by using combination of small display regions having frames. The display regions are referred to as "tags" (e.g., sticky notes). There are multiple types of tags. FIG. 6A and FIG. 6B, described below, show screen examples displayed on the display 16 of the electronic apparatus 10, and show a mathematical expression tag 110, a graph tag 120, a geometry tag 205, and so forth. The mathematical expression tag 110 is a tag (frame) where a mathematical expression(s), such as a function(s), representing a figure(s), is input. The graph tag 120 is a tag where a graph(s) is drawn, and used as a frame to draw a figure (s). In the graph tag 120, for example, a graph representing a mathematical expression input in the mathematical expression tag 110 is displayed. Mutually-related tags, such as the mathematical expression tag 110 and the graph tag 120, are visually connected by a line which is referred to as "string 119". Shape and length of the string 119 are determined by relative positions of the mutually-related tags displayed on the display screen of the display 16. The geometry tag 205 is a tag where a figure (s) or the like is drawn, and used as a frame to draw a figure(s).

[Operation of System]

The system 1 of the embodiment has many functions (in terms of functionality). Hereinafter, some of these will be described. Each function is realized by the electronic apparatus 10, the web server 20, and the arithmetic server 30 working in cooperation with one another. For example, when the electronic apparatus 10 where a web browser is running accesses the web server 20, the electronic apparatus 10 obtains programs from the web server 20. The CPU 11 of the electronic apparatus 10 executes the programs on the web browser. The CPU 11 of the electronic apparatus 10 executes various types of arithmetic operations and various types of display on the basis of information input onto the web browser by a user operating the input device 15 of the electronic apparatus 10. When arithmetic operations need to be executed by the arithmetic server 30, the CPU 11 of the electronic apparatus 10 sends information necessary for the arithmetic operations to the arithmetic server 30 via the web server 20. The arithmetic server 30 executes various types of arithmetic operations on the basis of information obtained from the electronic apparatus 10, and sends results of the arithmetic operations to the electronic apparatus 10 via the web server 20. The CPU 11 of the electronic apparatus 10 displays various images on the display 16 on the basis of information obtained from the arithmetic server 30.

Figure 7A:
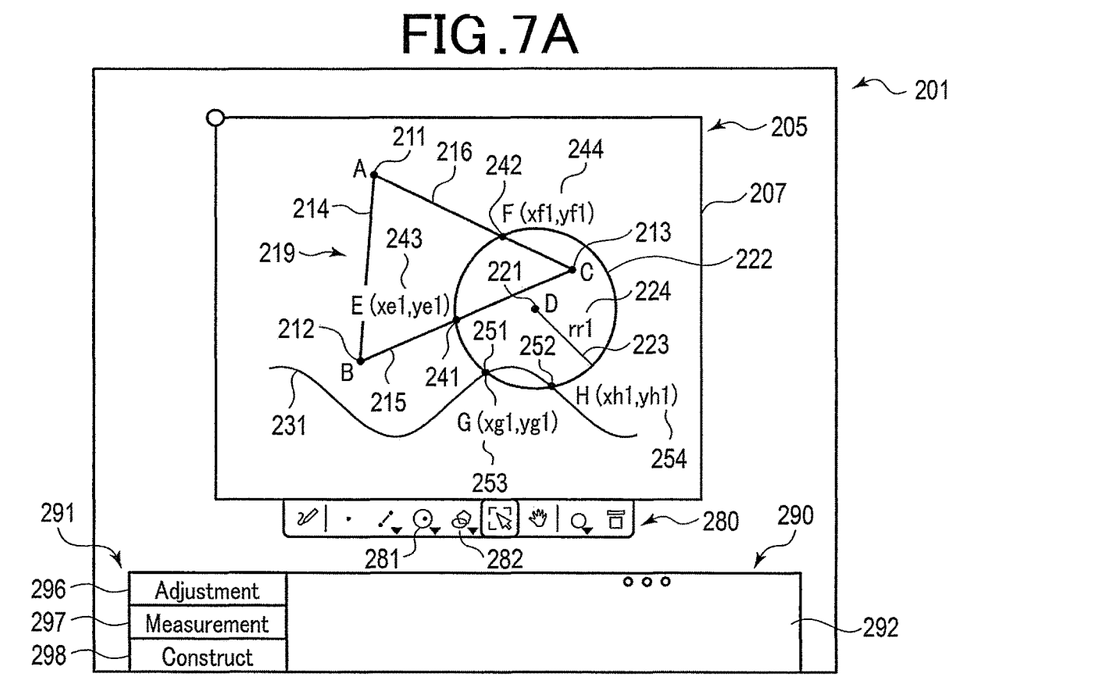
FIG. 7A shows an example of a screen relevant to a geometry tag and displayed on the electronic apparatus.
Figure 7B:
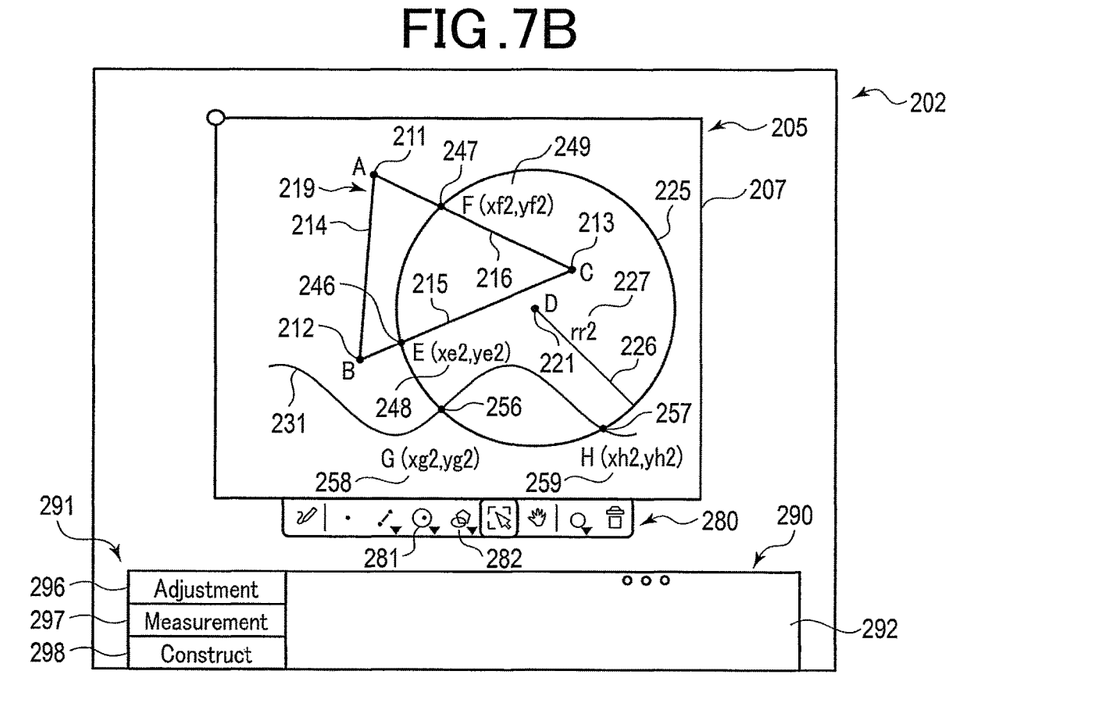
FIG. 7B shows an example of a screen relevant to the geometry tag and displayed on the electronic apparatus.

Operation of the electronic apparatus 10 according to the embodiment will be described with reference to FIG. 2 to FIG. 5, and, as needed, with reference to FIG. 6A to FIG. 7B. FIG. 2 to FIG. 5 show flowcharts. FIG. 6A and FIG. 6B show screen examples relevant to the graph tag 120. FIG. 7A and FIG. 7B show screen examples relevant to the geometry tag 250. Unless otherwise specified, a series of actions (steps) in the electronic apparatus 10 is mainly performed by the CPU 11.

Figure 2:
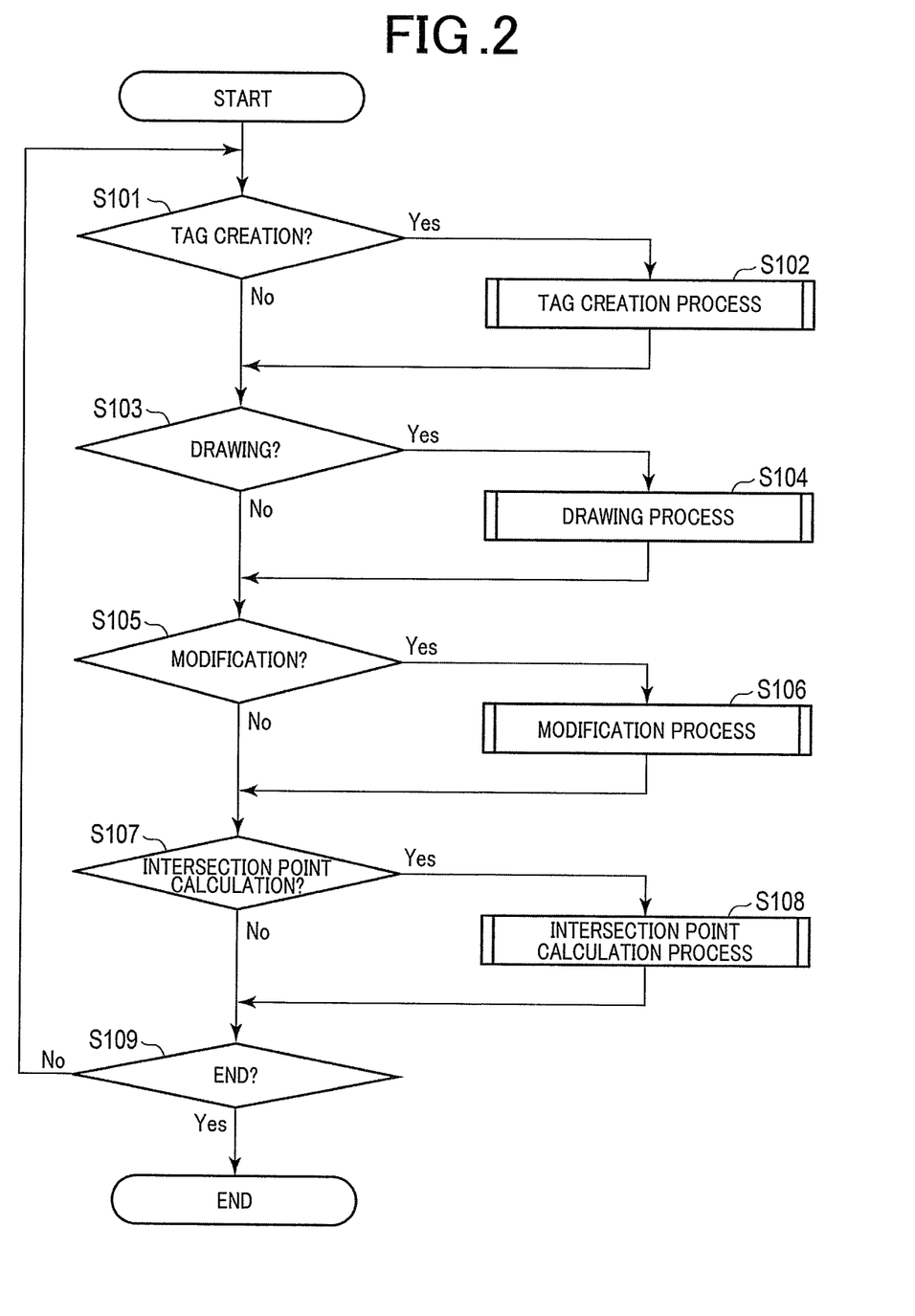
FIG. 2 is a flowchart showing outline of an example of a part of operation of an electronic apparatus according to an embodiment(s)

FIG. 2 is a flowchart showing outline of an example of a part of operation, a figure-related process, of the electronic apparatus 10.

In Step S101, the CPU 11 of the electronic apparatus 10 determines whether or not an instruction to create a tag (tag creation instruction) has been input by the user. When the CPU 11 of the electronic apparatus 10 determines that no tag creation instruction has been input, the figure-related process proceeds to Step S103. On the other hand, when the CPU 11 of the electronic apparatus 10 determines that a tag creation instruction has been input, the figure-related process proceeds to Step S102.

In Step S102, the CPU 11 of the electronic apparatus 10 performs a tag creation process. The figure-related process then proceeds to Step S103.

For example, in Step S102, the CPU 11 of the electronic apparatus 10 creates the mathematical expression tag 110 to input a mathematical expression to draw a graph in the graph tag 120 if a figure to draw is a graph as with the case of a screen (window) 101 shown in FIG. 6A. That is, the CPU 11 of the electronic apparatus 10 performs internal processing about settings of the mathematical expression tag 110, and displays the mathematical expression tag 110 on the display 16.

As another example, in Step S102, the CPU 11 of the electronic apparatus 10 creates the geometry tag 205 to draw a geometric figure or the like therein if a figure to draw is a geometric figure or the like as with the case of a screen (window) 201 shown in FIG. 7A. That is, the CPU 11 of the electronic apparatus 10 performs internal processing about settings of the geometry tag 205, and displays the geometry tag 205 on the display 16. In a figure display area 207 of the geometry tag 205, a coordinate system is set, and coordinate ranges predetermined or set in response to user operations are assigned thereto. At the default settings, coordinate axes (x axis and y axis) and coordinate graduations to indicate coordinates are hidden.

In Step S103, the CPU 11 of the electronic apparatus 10 determines whether or not an instruction on graph or figure (e.g., geometric figure) drawing (drawing instruction) has been input by the user. When the CPU 11 of the electronic apparatus 10 determines that no drawing instruction has been input, the figure-related process proceeds to Step S105. On the other hand, when the CPU 11 of the electronic apparatus 10 determines that a drawing instruction has been input, the figure-related process proceeds to Step S104.

Figure 3:
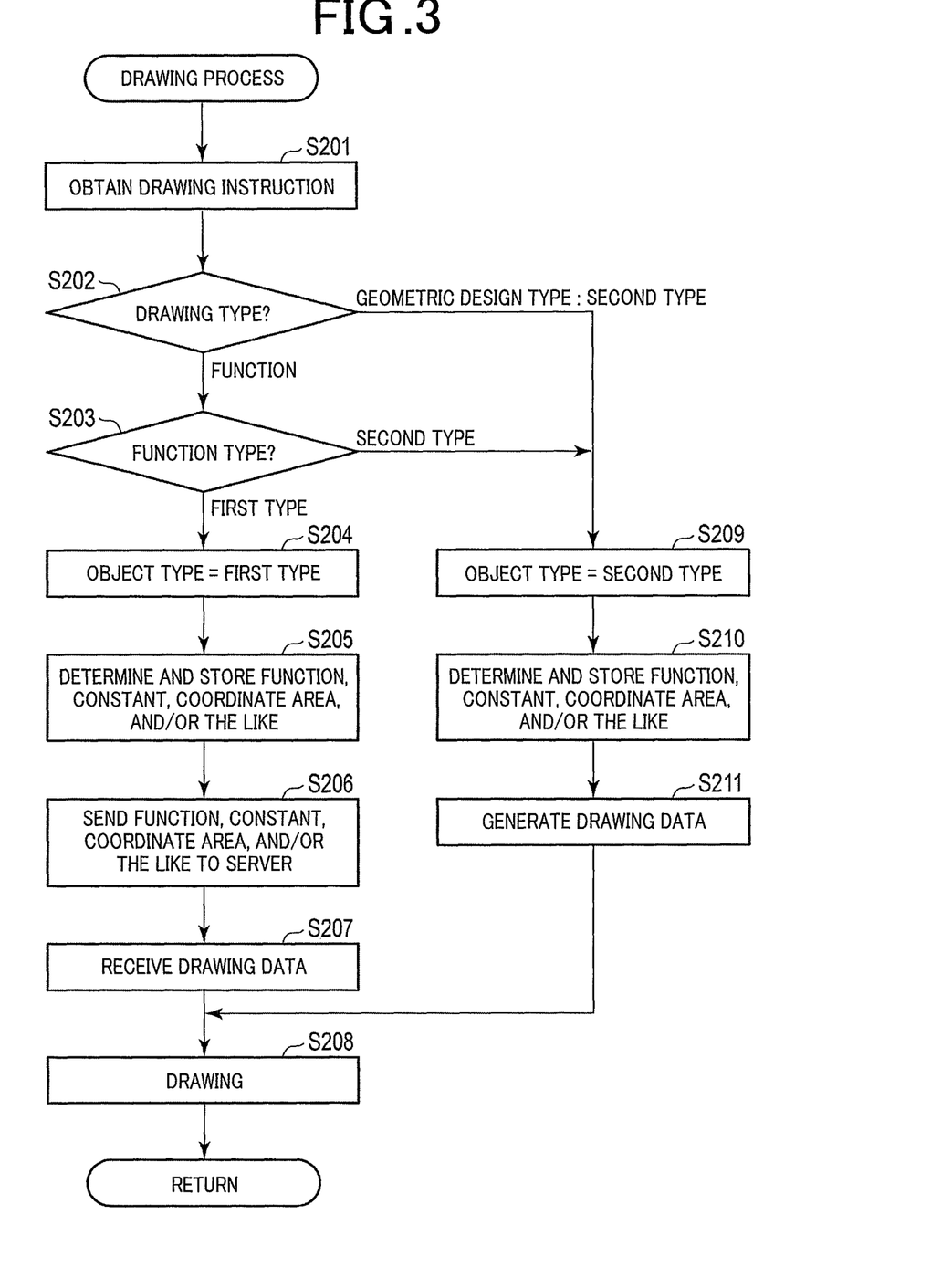
FIG. 3 is a flowchart showing outline of an example of a drawing process according to an embodiment(s)

In Step S104, the CPU 11 of the electronic apparatus 10 performs a drawing process. Hereinafter, the drawing process will be described with reference to FIG. 3. FIG. 3 shows its flowchart.

In Step S201, the CPU 11 of the electronic apparatus 10 obtains the drawing instruction input by the user. For example, as shown in FIG. 6A, for drawing a graph in the graph tag 120, the user inputs a mathematical expression into the mathematical expression tag 110 using the keyboard or the mouse, and then inputs a drawing execution instruction. The mathematical expression tag 110 may include two or more tags which are added according to the number of mathematical expressions to be input. In the case shown in FIG. 6A, the mathematical expression tag 110 includes three tags, namely, a first mathematical expression tag 111, a second mathematical expression tag 112, and a third mathematical expression tag 113. When a mathematical expression "y=sin(x)" is input into the first mathematical expression tag 111, and a drawing execution instruction is input, as described below, a first graph 131 representing "y=sin (x)" is displayed in a graph region 121 of the graph tag 120 on the display 16. Similarly, when a mathematical expression "y=x+1" is input into the second mathematical expression tag 112, and a drawing execution instruction is input, a second graph 132 representing "y=x+1" is displayed in the graph region 121. Still similarly, when a mathematical expression "y=x$^2$" is input into the third mathematical expression tag 113, and a drawing execution instruction is input, a third graph 133 representing "y=x$^2$" is displayed in the graph region 121. In the graph region 121 of the graph tag 120, a coordinate system is set, and coordinate ranges predetermined or set in response to user operations are assigned thereto.

As another example, as shown in FIG. 7A, for drawing a figure in the figure display area 207 of the geometry tag 205, an instruction is input, for example, as follows. When the user selects the geometry tag 205, a drawing menu 280 and a geometry menu 290 are displayed on the screen 201. The drawing menu 280 includes various icons for drawing figures in the figure display area 207. The geometry menu 290 includes a category area 291 and a display area 292. The category area 291 includes an "Adjustment" icon 296, a "Measurement" icon 297, and a "Construct" icon 298. When the "Adjustment" icon 296 is selected, icons for items to adjust figures are displayed in the display area 292. When the "Measurement" icon 297 is selected, icons for items to measure various types of characteristic quantity, such as area, length, and slope of a figure(s), are displayed in the display area 292. When the "Construct" icon 298 is selected, icons for items to display middle points, perpendiculars, intersection points, and so forth of a figure(s) are displayed in the display area 292.

The user who would like to draw a figure in the figure display area 207 selects an icon for the figure which the user desires to draw from the drawing menu 280. The drawing menu 280 includes a circle icon 281 for drawing circles, a polygon icon 282 for drawing polygons, and other icons. The user selects, from these icons, an icon for the figure which the user desires to draw, and operates the icon.

An example will be described, wherein the polygon icon 282 for drawing polygons is selected, and a triangle is drawn. As described below, when the user specifies a first point 211, a point indicated by "A" is drawn. Next, when the user specifies a second point 212, a point indicated by "B" is drawn, and also a first side 214 which connects the point "A" and the point "B" is drawn. Next, when the user specifies a third point 213, a point indicated by "C" is drawn, and also a second side 215 which connects the point "B" and the point "C" is drawn. Next, when the user specifies the first point 212, a third side 216 which connects the point "C" and the point "A" is drawn. As a result, a triangle 219 is drawn in the figure display area 207 of the geometry tag 205.

Another example will be described, wherein the circle icon 281 for drawing circles is selected, and a circle is drawn. When the user specifies a center point 221, a point indicated by "D" is drawn. Next, when the user specifies one point for the circumference of a circle which the user desires to draw, a first circle 222 having the distance from the point D to the specified one point as the radius and the point "D" as the center point 211, which is the center of the circle, is drawn. A straight line 223 and a value 224/rr1 both representing the radius may be displayed.

A figure representing a function may also be drawn in the figure display area 207 in the following manner. When a function icon is selected from icons which are displayed when the polygon icon 281 is selected, a frame to input a function (function input frame) is displayed. When the user inputs a function thereinto, a figure representing the function is drawn. For example, when the user inputs a trigonometric function into the function input frame, a sine curve 231 is drawn as shown in FIG. 7A.

In Step S201, the CPU 11 of the electronic apparatus 10 obtains such a user's drawing instruction. The CPU 11 of the electronic apparatus 10 performs various actions (steps) on the basis of the obtained input (instruction).

In Step S202, the CPU 11 of the electronic apparatus 10 determines whether a drawing type of the figure which the electronic apparatus 10 has been instructed by the user to draw is a function type or a geometric design type. For example, a graph to be drawn in the graph tag 120 is categorized as the function type. Among figures to be drawn in the figure display area 207 of the geometry tag 205, a figure to be drawn by input of a function is also categorized as the function type. The other figures to be drawn in the figure display area 207 are categorized as the geometric design type, and belong to a second type described below.

In Step S202, when the CPU 11 of the electronic apparatus 10 determines that the drawing type is the function type, the drawing process proceeds to Step S203. In Step S203, the CPU 11 of the electronic apparatus 10 determines whether the function type of the figure which the electronic apparatus 10 has been instructed by the user to draw is a first type or the abovementioned second type.

The first type is a type for which drawing data is obtained not by the electronic apparatus 10 but by the arithmetic server 30 executing an arithmetic operation(s). This is because arithmetic processing to derive drawing data for drawing the figure is heavy for the electronic apparatus 10, and the arithmetic server 30 can deal with more complicated arithmetic operations at higher speed than the electronic apparatus 10. For example, a trigonometric function, a function including differential calculus or integral calculus, and a function including Fourier transform are included in the first type.

The second type, which includes the geometric design type, is a type for which drawing data is obtained not by the arithmetic server 30 but by the electronic apparatus 10 executing an arithmetic operation(s). This is because arithmetic processing to derive drawing data for drawing the figure is light. For example, functions below are prepared in the program(s) which runs on the electronic apparatus 10.

As liner functions, for example, the following functions are prepared.

$$ax+by+c=0$$

$$y=ax+b$$

$$y=a+bx$$

$$x=ay+b$$

$$x=a+by$$

In the above functions, a, b, and c are arbitrary values.

For conic sections, for example, the following functions are prepared.

$$x=A(y-K)^2+H$$

$$x=Ay^2+By+C$$

$$y=A(x-H)^2+K$$

$$y=Ax^2+Bx+C$$

$$(x-H)^2+(y-K)^2=R^2$$

$$Ax^2+Ay^2+Bx+Cy+D=0$$

$$(x-H)^2/A^2+(y-K)^2/B^2=1$$

$$(x-H)^2/A^2-(y-K)^2/B^2=1$$

$$(y-K)^2/A^2-(x-H)^2/B^2=1$$

$$Ax^2+Bxy+C^2+Dx+Ey+F=0$$

In the above functions, A, B, C, D, E, F, H, and K are arbitrary values.

Function data including (i) a program for generating drawing data by executing arithmetic operations of the above functions and (ii) data on the above functions is stored, for example, in the ROM 12 as a memory. The memory may store function data of only either the linear functions or the functions expressing conic sections.

The first type is, in order words, a type for which drawing data is obtained not by the electronic apparatus 10 but by the arithmetic server 30 executing an arithmetic operation(s) because function data based on which figures of the first type are drawn is not in the memory of the electronic apparatus 10.

The second type, which includes the geometric design type, is, in order words, a type for which drawing data is obtained not by the arithmetic server 30 but by the electronic apparatus 10 executing an arithmetic operation(s) because function data based on which figures of the second type are drawn is in the memory of the electronic apparatus 10.

In Step S203, when the CPU 11 of the electronic apparatus 10 determines that the function type is the first type, the drawing process proceeds to Step S204. In Step S204, the CPU 11 of the electronic apparatus 10 sets an object type flag for the figure to the first type.

In Step S205, the CPU 11 of the electronic apparatus 10 determines and stores relevant data which includes a function, a coefficient(s), a constant(s), a coordinate area, and/or various settings relevant to the figure to draw. In Step S206, the CPU 11 of the electronic apparatus 10 sends the determined relevant data, which includes a function, a coefficient (s), a constant (s), a coordinate area, and/or various settings, to the arithmetic server 30 via the web server 20. The data format of the relevant data sent from the electronic apparatus 10 is in accordance with the program provided from the web server 20 and being executed by the electronic apparatus 10.

The arithmetic server 30 obtains, via the web server 20, the relevant data, which includes a function, a coefficient(s), a constant (s), a coordinate area, and/or various settings, sent from the electronic apparatus 10. The arithmetic server 30 executes, on the basis of the obtained relevant data, a complicated arithmetic operation(s) at high speed in accordance with an internal program(s), thereby generating drawing data which includes coordinate data indicating coordinates of drawing points necessary for the electronic apparatus 10 to draw the figure. The arithmetic server 30 sends the generated drawing data to the electronic apparatus 10 via the web server 20. The data format of the drawing data sent from the arithmetic server 30 is in accordance with the program provided from the web server 20 and being executed by the electronic apparatus 10.

In Step S207, the CPU 11 of the electronic apparatus 10 receives the drawing data. In Step S208 after Step S207, the CPU 11 of the electronic apparatus 10 draws the figure on the basis of the drawing data without executing an arithmetic operation for obtaining the drawing data by itself. After the CPU 11 of the electronic apparatus 10 draws the figure, the drawing process ends.

In Step S202, when the CPU 11 of the electronic apparatus 10 determines that the drawing type is the geometric design type, namely, the second type, the drawing process proceeds to Step S209. Also, in Step S203, when the CPU 11 of the electronic apparatus 10 determines that the function type is the second type, the drawing process proceeds to Step S209.

In Step S209, the CPU 11 of the electronic apparatus 10 sets the object type flag for the figure to the second type.

In Step S210, the CPU 11 of the electronic apparatus 10 determines and stores relevant data which includes a function, a coefficient(s), a constant(s), a coordinate area, and/or various settings relevant to the figure to draw. In Step S211, the CPU 11 of the electronic apparatus 10 reads the function data, which has (i) the program for generating drawing data by executing arithmetic operations of the above functions and (ii) the data on the functions, from the memory of the electronic apparatus 10. Then, the CPU 11 of the electronic apparatus 10 executes an arithmetic operation for drawing the figure on the basis of (i) the relevant data, which includes a function, a coefficient(s), a constant(s), a coordinate area, and/or various settings, having been determined in response to user operations, and (ii) the read function data. As a result of the arithmetic operation, the CPU 11 of the electronic apparatus 10 generates drawing data which includes coordinate data indicating coordinates of drawing points necessary to draw the figure without requesting the arithmetic server 30 to generate the drawing data. The drawing process then proceeds to Step S208. That is, in Step S208 after Step S211, the CPU 11 of the electronic apparatus 10 draws the figure on the basis of the drawing data generated by itself without requesting the arithmetic server 30 to generate the drawing data. After the CPU 11 of the electronic apparatus 10 draws the figure, the drawing process ends.

For example, in the case shown in FIG. 6A, suppose that a function input in the first mathematical expression tag 111 is fixed, and an instruction to draw a graph representing the function input in the first mathematical expression tag 111 is input. The mathematical expression input in the first mathematical expression tag 111 is "y=sin(x)". Because this is the case where a graph is drawn in the graph tag 120 on the basis of a mathematical expression input in the mathematical expression tag 110, in Step S202, the CPU 11 of the electronic apparatus 10 determines that the drawing type is the function type. Because "y=sin(x)" is a trigonometric function, in Step S203, the CPU 11 of the electronic apparatus 10 determines that the function type is the first type.

In Step S204, the CPU 11 of the electronic apparatus 10 sets the object type flag for the object to draw to the first type. In Step 205, the CPU 11 of the electronic apparatus 10 determines a function, a coordinate area, and/or the like (i.e., relevant data). In Step S206, the CPU 11 of the electronic apparatus 10 sends the determined information to the arithmetic server 30 via the web server 20. Here, the function is "y=sin(x)". Further, in the case shown in FIG. 6A, the coordinate area of the graph region 121 of the graph tag 120 is $-5 \leq x \leq 5$ and $-3 \leq y \leq 3$. On the basis of the information, the arithmetic server 30 calculates coordinates of points (i.e., generates drawing data) necessary to plot to draw a graph of "y=sin (x)" in the coordinate area of $-5 \leq x \leq 5$ and $-3 \leq y \leq 3$. The arithmetic server 30 sends the calculation result, which is data of the coordinate group, to the electronic apparatus 10. In Step S208, the CPU 11 of the electronic apparatus 10 draws the first graph 131 representing "y=sin(x)" in the graph tag 120 on the basis of the data of the coordinate group received in Step S207.

As another example, suppose that an instruction to draw a graph representing a function input in the second mathematical expression tag 112 is input. The mathematical expression input in the second mathematical expression tag 112 is "y=x+1". Because this is the case where a graph is drawn in the graph tag 120 on the basis of a mathematical expression input in the mathematical expression tag 110, in Step S202, the CPU 11 of the electronic apparatus 10 determines that the drawing type is the function type. Because "y=x+1" is one of the linear functions enumerated above, in Step S203, the CPU 11 of the electronic apparatus 10 determines that the function type is the second type.

In Step S209, the CPU 11 of the electronic apparatus 10 sets the object type flag for the object to draw to the second type. In Step 210, the CPU 11 of the electronic apparatus 10 determines relevant data which includes a function, a coefficient(s), a constant(s), a coordinate area, and/or various settings. In Step S211, on the basis of the relevant data, the CPU 11 of the electronic apparatus 10 generates drawing data which includes coordinate data indicating coordinates of drawing points necessary to plot to draw a graph of "y=x+1" in the coordinate area of $-5 \leq x \leq 5$ and $-3 \leq y \leq 3$. In Step S208, the CPU 11 of the electronic apparatus 10 draws the second graph 132 representing "y=x+1" in the graph tag 120 on the basis of the generated drawing data.

As another example, suppose that an instruction to draw a graph representing a function input in the third mathematical expression tag 113 is input. The mathematical expression input in the third mathematical expression tag 113 is "y=x$^2$". Because this is the case where a graph is drawn in the graph tag 120 on the basis of a mathematical expression input in the mathematical expression tag 110, in Step S202, the CPU 11 of the electronic apparatus 10 determines that the drawing type is the function type. Because "y=x$^2$" is one of the functions for conic sections enumerated above, in Step S203, the CPU 11 of the electronic apparatus 10 determines that the function type is the second type.

In Step S209, the CPU 11 of the electronic apparatus 10 sets the object type flag for the object to draw to the second type. In Step 210, the CPU 11 of the electronic apparatus 10 determines a function, a coefficient(s), a constant(s), a coordinate area, and/or various settings (i.e., relevant data). In Step S211, on the basis of the information, the CPU 11 of the electronic apparatus 10 calculates coordinates of points (i.e., generates drawing data) necessary to plot to draw a graph of "y=x$^2$" in the coordinate area of $-5 \leq x \leq 5$ and $-3 \leq y \leq 3$. In Step S208, the CPU 11 of the electronic apparatus 10 draws the third graph 133 representing "y=x$^2$" in the graph tag 120 on the basis of the data of the calculated coordinate group.

The case shown in FIG. 7A will be described. When the user selects the polygon icon 282, and specifies the position of the first point 211, in Step S201, the CPU 11 of the electronic apparatus 10 obtains this input as the drawing instruction. Because this input is for drawing a geometric figure, in Step S202, the CPU 11 of the electronic apparatus 10 determines that the drawing type is the geometric design type. The CPU 11 of the electronic apparatus 10 sets the object type flag to the second type in Step S209, determines and stores that a point has been specified in Step S210, and identifies coordinates of the specified first point 211 in Step S211. In Step S208, the CPU 11 of the electronic apparatus 10 draws a circular marker representing a point at the coordinates of the first point 211, and also displays "A" near there.

Next, when the user specifies the position of the second point 212, in Step S201, the CPU 11 of the electronic apparatus 10 obtains this input as the drawing instruction. Because this input is for drawing a geometric figure, in Step S202, the CPU 11 of the electronic apparatus 10 determines that the drawing type is the geometric design type. The CPU 11 of the electronic apparatus 10 sets the object type flag to the second type in Step S209, determines and stores that a point has been specified in Step S210, and identifies coordinates of the specified second point 212 in Step S211. In Step S210, the CPU 11 of the electronic apparatus 10 also determines a function and a constant(s) for connecting the first point 211 and the second point 212, and determines its drawing area between the first point 211 and the second point 212. In Step S211, the CPU 11 of the electronic apparatus 10 identifies coordinates of points necessary to draw a straight line that connects the first point 211 and the second pint 212. The coordinates may be the coordinates of the first point 211 and the coordinates of the second point 212, or may further include coordinates of one or more points between the first point 211 and the second point 212. In Step S208, the CPU 11 of the electronic apparatus 10 draws a circular marker representing a point at the coordinates of the second point 212, and also displays "B" near there. Further, the CPU 11 of the electronic apparatus 10 draws the straight line which connects the first point 211 and the second point 212 as a first side 214.

Similarly, when the user specifies the position of the third point 213, in Step S208, the CPU 11 of the electronic apparatus 10 draws a circular marker representing a point at the coordinates of the third point 213, and also displays "C" near there. Further, the CPU 11 of the electronic apparatus 10 draws a straight line which connects the second point 212 and the third point 213 as a second side 215. Still similarly, when the user specifies the position of the first point 211, in Step S208, the CPU 11 of the electronic apparatus 10 draws a straight line which connects the third point 213 and the first point 211 as a third side 216. As a result, the triangle 219 is drawn.

When the user selects the circle icon 281, and specifies the position of the center point 221, in Step S201, the CPU 11 of the electronic apparatus 10 obtains this input as the drawing instruction. Because this input is for drawing a geometric figure, in Step S202, the CPU 11 of the electronic apparatus 10 determines that the drawing type is the geometric design type. The CPU 11 of the electronic apparatus 10 sets the object type flag to the second type in Step S209, determines and stores that a point has been specified in Step S210, and identifies coordinates of the specified center point 221 in Step S211. In Step S208, the CPU 11 of the electronic apparatus 10 draws a circular marker representing a point at the coordinates of the center point 221, and also displays "D" near there.

Next, when the user specifies the position of any point for the circumference of a circle which the user desires to draw, in Step S201, the CPU 11 of the electronic apparatus 10 obtains this input as the drawing instruction. Because this input is for drawing a geometric figure, in Step S202, the CPU 11 of the electronic apparatus 10 determines that the drawing type is the geometric design type. In Step S209, the CPU 11 of the electronic apparatus 10 sets the object type flag to the second type. In Step S210, the CPU 11 of the electronic apparatus 10 determines and stores: a function and a constant(s) for the circle having the center point 221 as the center and the specified point for the circumference, namely, the circle having the distance between the center point 221 and the specified point as the radius; and a coordinate area. In Step S211, the CPU 11 of the electronic apparatus 10 calculates coordinates, thereby generating drawing data which includes coordinate data indicating coordinates of drawing points for drawing the circumference. In Step S208, the CPU 11 of the electronic apparatus 10 draws a first circle 222 on the basis of the calculated coordinates. Similarly, the CPU 11 of the electronic apparatus 10 may also draw the straight line 223 which connects the center point 221 and the specified point and represents the radius. The CPU 11 of the electronic apparatus 10 may also display the value 224/rr1 which represents the radius.

In order to express, with a mathematical expression and a constant(s), a figure drawn by selecting an icon from the drawing menu 280, the following may be used, for example.

Straight line: coordinate values of two points

Circle: coordinate values of center and radius

Ellipse: coordinate values of two focuses and sum of distances from the focuses

Hyperbola: coordinate values of two focuses and difference between distances from the focuses Parabola: one focus and one straight line When the user selects the function icon from the icons which are displayed by the polygon icon 282 being selected, the function input frame is displayed, and the user inputs "y=sin(x)" thereinto, so that the drawing instruction to draw a sine curve is input. In Step S201, the CPU 11 of the electronic apparatus 10 obtains this instruction (input). Because the input mathematical expression is "y=sin(x)", in Step S202, the CPU 11 of the electronic apparatus 10 determines that the drawing type is the function type. Because "y=sin(x)" is a trigonometric function, in Step S203, the CPU 11 of the electronic apparatus 10 determines that the function type is the first type.

In Step S204, the CPU 11 of the electronic apparatus 10 sets the object type flag for the object to draw to the first type. In Step S205, the CPU 11 of the electronic apparatus 10 determines a function of interest, namely, "y=sin(x)", a coordinate area, and/or the like (i.e., relevant data). In Step S206, the CPU 11 of the electronic apparatus 10 sends the determined information to the arithmetic server 30 via the web server 20. On the basis of the information, the arithmetic server 30 calculates coordinates of points (i.e., generates drawing data) necessary to plot to draw a graph of "y=sin (x)" in the determined coordinate area. The arithmetic server 30 sends the calculation result, which is data of the coordinate group, to the electronic apparatus 10. In Step S208, the CPU 11 of the electronic apparatus 10 draws the sine curve 231 representing "y=sin (x)" in the figure display area 207 of the geometry tag 205 on the basis of the data of the coordinate group received in Step S207.

As described above, according to the type of the figure to draw, the CPU 11 of the electronic apparatus 10 sets the object type flag to the first type or the second type. When the object type flag is the first type, the CPU 11 of the electronic apparatus 10 requests the arithmetic server 30 to generate drawing data which includes coordinate data indicating coordinates of drawing points for drawing the figure, and draws the figure on the basis of the drawing data, which includes coordinate data included in a response from the arithmetic server 30. On the other hand, when the object type flag is the second type, the CPU 11 of the electronic apparatus 10 generates drawing data which includes coordinate data indicating coordinates of drawing points for drawing the figure, and draws the figure on the basis of the coordinates included in the drawing data.

Referring back to FIG. 2, in Step S105, the CPU 11 of the electronic apparatus 10 determines whether or not an instruction to modify the figure (modification instruction) has been input by the user. When the CPU 11 of the electronic apparatus 10 determines that no modification instruction has been input, the figure-related process proceeds to Step S107. On the other hand, when the CPU 11 of the electronic apparatus 10 determines that a modification instruction has been input, the figure-related process proceeds to Step S106.

Figure 4:
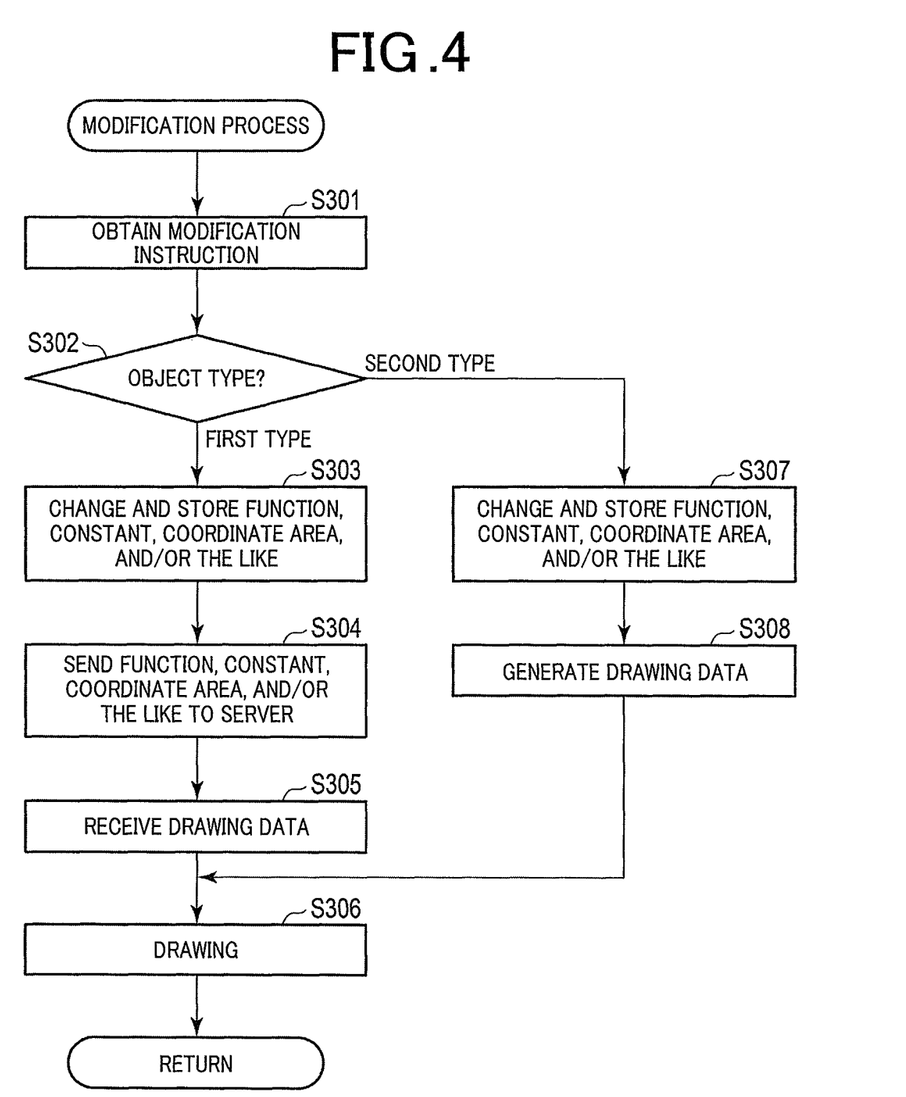
FIG. 4 is a flowchart showing outline of an example of a modification process according to an embodiment(s)

In Step S106, the CPU 11 of the electronic apparatus 10 performs a modification process. Hereinafter, the modification process will be described with reference to FIG. 4. FIG. 4 shows its flowchart.

In Step S301, the CPU 11 of the electronic apparatus 10 obtains the input modification instruction. For example, suppose that an instruction to move the first graph 131 shown in FIG. 6A downward (parallel to the y axis in the minus direction) is input. This instruction is input, for example, by operating the mouse so as to drag the first graph 131 downward by a desired movement quantity. The CPU 11 of the electronic apparatus 10 which has obtained this instruction modifies the displayed contents to be like a screen (window) 102 shown in FIG. 6B. That is, the CPU 11 of the electronic apparatus 10 deletes the first graph 131, and displays a fourth graph 134 to which the first graph 131 has been translated by −1 along the y axis. Accordingly, the CPU 11 of the electronic apparatus 10 changes the displayed contents of the first mathematical expression tag 111 from "y=sin(x)" to "y=sin(x)−1".

As another example, suppose that an instruction to increase the radius of the first circle 222 shown in FIG. 7A is input. This instruction is input, for example, by operating the mouse so as to drag the circumference of the first circle 222 outward by a desired quantity. The CPU 11 of the electronic apparatus 10 which has obtained this instruction modifies the displayed contents to be like a screen (window) 202 shown in FIG. 7B. That is, the CPU 11 of the electronic apparatus 10 deletes the first circle 222, and displays a second circle 225 having the radius to which the radius of the first circle 222 has been increased. The CPU 11 of the electronic apparatus 10 may also update and display the straight line 223, which represents the radius, to a straight line 226 according to the radius, and update and display the value 224/rr1, which represents the radius, to a value 227/rr2 according to the radius.

Other examples of the modification include, in the case shown in FIG. 6A, translating, rotating, inverting, enlarging, and reducing the first graph 131, the second graph 132, and the third graph 133; changing the cycle(s) and value ranges of the first graph 131; and changing the degree of opening of the third graph 133, and also include, in the case shown in FIG. 7A, translating, rotating, inverting, enlarging, and reducing the triangle 219, the first circle 222, and the sine curve 231; transforming the triangle 219; and changing the cycle(s) and value ranges of the sine curve 231. Modification instructions to do the above may be input.

Referring back to FIG. 4, in Step S302, the CPU 11 of the electronic apparatus 10 determines whether the object type flag for the object for which the modification instruction has been input is the first type or the second type. The object type flags are stored for the respective objects in Step S204 or Step S209. In Step S302, the CPU 11 of the electronic apparatus 10 reads this information, and determines whether the object type flag for the object is the first type or the second type. When the CPU 11 of the electronic apparatus 10 determines that the object type flag is the first type, the modification process proceeds to Step S303.

In Step S303, the CPU 11 of the electronic apparatus 10 analyzes the obtained modification instruction, and changes the relevant data, which includes a function, a constant (s), and/or the like, and stores the changed relevant data. For example, when changing the cycle of the first graph 131 expressed by "y=sin(x)", the CPU 11 of the electronic apparatus 10 changes the function to "y=sin(ax)", and changes the value of the coefficient a according to the cycle. As another example, when moving the first graph 131 expressed by "y=sin(x)" along the x axis, the CPU 11 of the electronic apparatus 10 changes the function to "y=sin(x−a)", and changes the value of the constant a according to the movement quantity.

In Step S304, the CPU 11 of the electronic apparatus 10 sends the relevant data, which includes a function, a coefficient(s), a constant(s), a coordinate area, and/or various settings, changed in Step S303 to the arithmetic server 30 via the web server 20. The data format of the relevant data sent from the electronic apparatus 10 is, as with Step S206, in accordance with the program provided from the web server 20 and being executed by the electronic apparatus 10.

The arithmetic server 30 obtains, via the web server 20, the relevant data, which includes a function, a coefficient(s), a constant (s), a coordinate area, and/or various settings, sent from the electronic apparatus 10. The arithmetic server 30 executes an arithmetic operation for drawing the figure on the basis of the obtained relevant data, thereby generating drawing data which includes coordinate data indicating coordinates of drawing points necessary for the electronic apparatus 10 to draw the figure. The arithmetic server 30 sends the generated drawing data to the electronic apparatus 10 via the web server 20. The data format of the drawing data sent from the arithmetic server 30 is in accordance with the program provided from the web server 20 and being executed by the electronic apparatus 10.

In Step S305, the CPU 11 of the electronic apparatus 10 receives the drawing data, which includes coordinate data indicating coordinates of drawing points. In Step S306, the CPU 11 of the electronic apparatus 10 redraws the figure on the basis of the drawing data, which includes coordinate data indicating coordinates of drawing points. After the CPU 11 of the electronic apparatus 10 redraws the figure, the modification process ends.

In Step S302, when the CPU 11 of the electronic apparatus 10 determines that the object type flag is the second type, the modification process proceeds to Step S307. In Step S307, the CPU 11 of the electronic apparatus 10 analyzes the obtained modification instruction, and changes the function, constant(s), coefficient(s), constant(s), coordinate area, and/or the like (i.e., relevant data), and stores the changed ones. For example, when translating the second graph 132 expressed by "y=x+1", the CPU 11 of the electronic apparatus 10 changes the function to "y=(x−a)+1+b", and changes the values of the constants a and b according to the movement quantity. As another example, when changing the slope of the second graph 132 expressed by "y=x+1", the CPU 11 of the electronic apparatus 10 changes the function to "y=ax+1", and changes the value of the coefficient a according to the slope.

In Step S308, the CPU 11 of the electronic apparatus 10 executes an arithmetic operation for drawing the figure on the basis of the changed function, coefficient(s), constant(s), coordinate area, and/or the like (i.e., changed relevant data), thereby generating drawing data which includes coordinate data indicating coordinates of drawing points necessary to draw the figure. The modification process then proceeds to Step S306. In Step S306, the CPU 11 of the electronic apparatus 10 redraws the figure on the basis of the drawing data. After the CPU 11 of the electronic apparatus 10 redraws the figure, the modification process ends.

As described above, in modifying a figure too, according to the type of the figure to draw, the CPU 11 of the electronic apparatus 10 requests the arithmetic server 30 to generate drawing data which includes coordinate data indicating coordinates of drawing points for drawing the figure, or generates drawing data which includes coordinate data indicating coordinates of drawing points for drawing the figure by itself. When the object type is the first type, the electronic apparatus 10 needs to send/receive data to/from the web server 20, and the arithmetic server 30 needs to execute an arithmetic operation(s). These require a certain amount of time. Hence, after the modification operation settles, for example, after the user stops moving the mouse, the CPU 11 of the electronic apparatus 10 sends/receives data to/from the web server 20, and the arithmetic server 30 executes an arithmetic operation(s). On the other hand, when the object type is the second type, the electronic apparatus 10 does not need to send/receive data to/from the web server 20, and often a load of an arithmetic operation(s) to be executed by the electronic apparatus 10 is not so heavy. Hence, the CPU 11 of the electronic apparatus 10 may recalculate coordinates (i.e., regenerate drawing data) and redraw the figure while the user keeps moving the mouse, namely, in real time.

Referring back to FIG. 2, in Step S107, the CPU 11 of the electronic apparatus 10 determines whether or not an instruction to calculate an intersection point(s) of figures (intersection point calculation instruction) has been input by the user. In the embodiment, the system 1 has a function (in terms of functionality) to generate drawing data which includes intersection point data indicating coordinates of an intersection point(s) of specified two figures, and display the intersection point(s).

For example, in the case shown in FIG. 6A, suppose that the function to calculate intersection point data is selected from a functional menu, and the first graph 131 and the second graph 132 are selected. In this case, as shown in FIG. 6A, a first intersection point 141 which is an intersection point of the first graph 131 and the second graph 132 is displayed as an intersection point A, and its coordinates (xa1, ya1) are displayed. As another example, suppose that the function to calculate intersection point data is selected, and the second graph 132 and the third graph 133 are selected. In this case, a second intersection point 142 which is an intersection point of the second graph 132 and the third graph 133 is displayed as an intersection point B, and its coordinates (xb1, yb1) are displayed, and also a third intersection point 143 which is an intersection point of the second graph 132 and the third graph 133 is displayed as an intersection point C, and its coordinates (xc1, yc1) are displayed.

For example, in the case shown in FIG. 7A, suppose that an intersection point calculation icon which is displayed in the display area 292 by the "Construct" icon 298 being selected is selected, and the triangle 219 and the first circle 222 are selected. In this case, as shown in FIG. 7A, a fourth intersection point 241 which is an intersection point of the triangle 219 and the first circle 222 is displayed as an intersection point E, and its coordinates (xe1, ye1) are displayed, and also a fifth intersection point 242 which is an intersection point of the triangle 219 and the first circle 222 is displayed as an intersection point F, and its coordinates (xf1, yf1) are displayed. As another example, suppose that the intersection point calculation icon is selected, and the first circle 222 and the sine curve 231 are selected. In this case, a sixth intersection point 251 which is an intersection point of the first circle 222 and the sine curve 231 is displayed as an intersection point G, and its coordinates (xg1, yg1) are displayed, and also a seventh intersection point 252 which is an intersection point of the first circle 222 and the sine curve 231 is displayed as an intersection point H, and its coordinates (xh1, yh1) are displayed.

Figure 5:
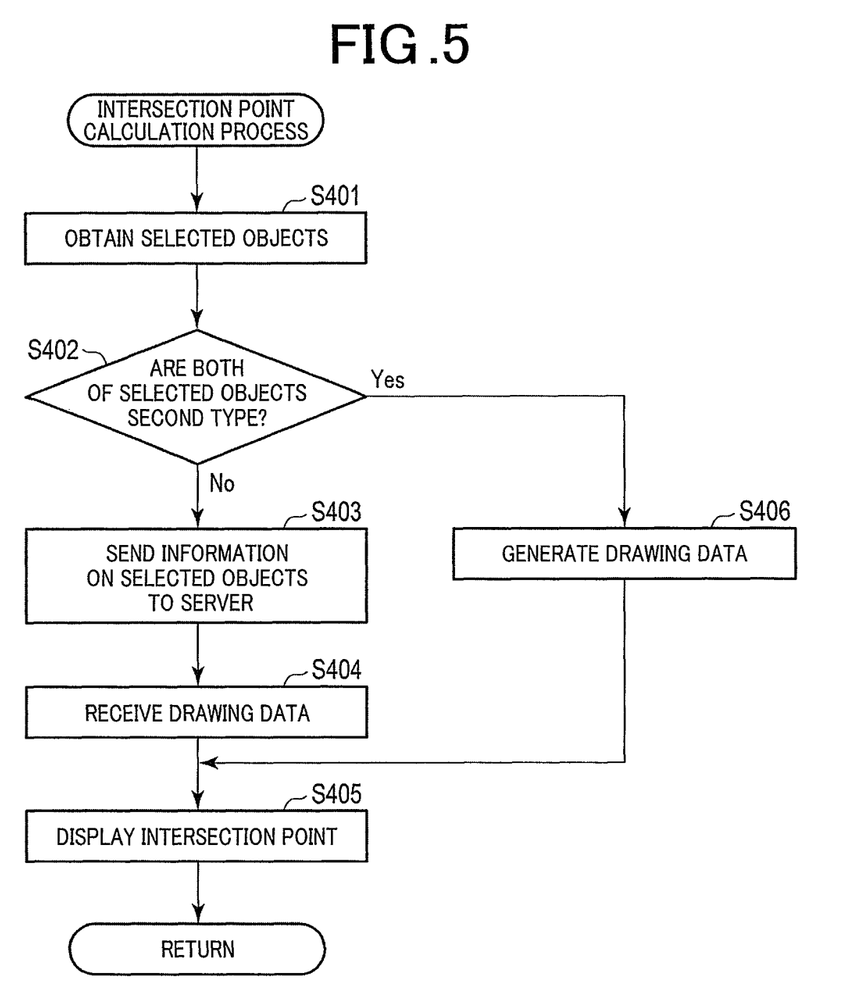
FIG. 5 is a flowchart showing outline of an example of an intersection point calculation process according to an embodiment(s)

In Step S107, when the CPU 11 of the electronic apparatus 10 determines that no intersection point calculation instruction has been input, the figure-related process proceeds to Step S109. On the other hand, when the CPU 11 of the electronic apparatus 10 determines that an intersection point calculation instruction has been input, the figure-related process proceeds to Step S108. In Step S108, the CPU 11 of the electronic apparatus 10 performs an intersection point calculation process. Hereinafter, the intersection point calculation process will be described with reference to FIG. 5. FIG. 5 shows its flowchart.

In Step S401, the CPU 11 of the electronic apparatus 10 obtains information on two objects selected to obtain an intersection point(s). This information includes functions, coefficients, constants, coordinate areas, and/or object types relevant to the respective objects.

In Step S402, the CPU 11 of the electronic apparatus 10 determines whether or not both of the selected objects are the second type. When the CPU 11 of the electronic apparatus 10 determines that not both of the selected objects are the second type, namely, at least one of the objects is the first type, the intersection point calculation process proceeds to Step S403. For example, in the case shown in FIG. 6A, when the first graph 131 and the second graph 132 are selected, because the first graph 131 is the first type, the intersection point calculation process proceeds to Step S403. As another example, in the case shown in FIG. 7A, when the first circle 222 and the sine curve 231 are selected, because the sine curve 231 is the first type, the intersection point calculation process proceeds to Step S403.

In Step S403, the CPU 11 of the electronic apparatus 10 sends, to the arithmetic server 30 via the web server 20, the information on the selected objects, the information including functions and coordinate areas, and a message to request an intersection point(s) of the objects.

The arithmetic server 30 which has received this request calculates coordinates of an intersection point(s) about the received functions, thereby generating drawing data which includes coordinate data indicating coordinates of an intersection point(s). The arithmetic server 30 sends the drawing data to the electronic apparatus 10 via the web server 20.

In Step S404, the CPU 11 of the electronic apparatus 10 receives the drawing data, which includes coordinate data indicating intersection point(s). In Step S405, the CPU 11 of the electronic apparatus 10 adds the intersection point(s) and its/their coordinates to the displayed contents on the basis of the received drawing data. As a result, in the case of the screen 101 shown in FIG. 6A, about the first intersection point 141, which is an intersection point of the first graph 131 and the second graph 132, as indicated by "151", the intersection point A and its coordinates (xa1, ya1) are additionally displayed. As another example, in the case of the screen 201 shown in FIG. 7A, about the sixth intersection point 251, which is an intersection point of the first circle 222 and the sine curve 231, as indicated by "253", the intersection point G and its coordinates (xg1, yg1) are additionally displayed, and about the seventh intersection point 252, which is an intersection point of the first circle 222 and the sine curve 231, as indicated by "254", the intersection point H and its coordinates (xh1, xh1) are additionally displayed. The intersection point calculation process then ends.

In Step S402, when the CPU 11 of the electronic apparatus 10 determines that both of the selected objects are the second type, the intersection point calculation process proceeds to Step S406. For example, in the case shown in FIG. 6A, when the second graph 132 and the third graph 133 are selected, because both of the graphs are the second type, the intersection point calculation process proceeds to Step S406. As another example, in the case shown in FIG. 7A, when the triangle 219 and the first circle 222 are selected, because both of the figures are the second type, the intersection point calculation process proceeds to Step S406.

In Step S406, the CPU 11 of the electronic apparatus 10 calculates coordinates of an intersection point (s) on the basis of the functions of the selected objects, thereby generating drawing data which includes coordinate data indicating intersection point(s). In Step S405, the CPU 11 of the electronic apparatus 10 adds the intersection point(s) and its/their coordinates to the displayed contents on the basis of the generated drawing data. As a result, in the case of the screen 101 shown in FIG. 6A, about the second intersection point 142, which is an intersection point of the second graph 132 and the third graph 133, as indicated by "152", the intersection point B and its coordinates (xb1, yb1) are additionally displayed, and about the third intersection point 143, which is an intersection point of the second graph 132 and the third graph 133, as indicated by "153", the intersection point C and its coordinates (xc1, yc1) are additionally displayed. As another example, in the case of the screen 201 shown in FIG. 7A, about the fourth intersection point 241, which is an intersection point of the triangle 219 and the first circle 222, as indicated by "243", the intersection point E and its coordinates (xe1, ye1) are additionally displayed, and about the fifth intersection point 242, which is an intersection point of the triangle 219 and the first circle 222, as indicated by "244", the intersection point F and its coordinates (xf1, xf1) are additionally displayed. The intersection point calculation process then ends.

For example, coordinates (x, y) of an intersection point of straight lines expressed by "y=ax+b" and "y=cx+d" are calculated by the following expressions.

$$x=(d-b)/(a-c)$$

$$y=(ad-bc)/(a-c)$$

In the expressions, a is not equal to c.

Coordinates of an intersection point of straight lines can be easily calculated by deriving the above calculation expressions in advance, and substituting values for variables (a, b, c, and d) about the straight-line objects. Coordinates of an intersection point(s) can be easily calculated by preparing necessary intersection point calculation expressions in advance for, for example, in addition to (i) a straight line and a straight line, (ii) a circle and a straight line, (iii) a circle and a circle, and (iv) an ellipse and a circle, and reading and using a proper calculation expression(s) for target objects.

Referring back to FIG. 2, in Step S109, the CPU 11 of the electronic apparatus 10 determines whether or not to end the figure-related process. When the CPU 11 of the electronic apparatus 10 determines to end the figure-related process, the figure-related process ends. On the other hand, when the CPU 11 of the electronic apparatus 10 determines not to end the figure-related process, the figure-related process returns to Step S101. That is, in response to inputs from the user, drawing a figure(s), modifying the figure(s), and calculating an intersection point (s) of the figures, and so forth are repeated.

For example, when, in the state shown in FIG. 6A, the first graph 131 is selected, and an instruction to translate the first graph 131 by −1 along the y axis is input, as described above, the modification process in Step S106 is performed, so that, as shown in FIG. 6B, the first graph 131 is deleted, and the fourth graph 134 to which the first graph 131 has been translated is drawn. In addition to this, the intersection point calculation process in Step S108 is performed, so that the intersection point with the second graph 132 is updated. That is, coordinates of an eighth intersection point 144 which is an intersection point of the fourth graph 134 and the second graph 132 are calculated, and as indicated by "154", the displayed position of the intersection point A is changed, and its coordinates are updated to the calculated coordinates (xa2, ya2).

Similarly, when, in the state shown in FIG. 7A, the first circle 222 is selected, and an instruction to increase its radius is input, as described above, the modification process in Step S106 is performed, so that, as shown in FIG. 7B, the first circle 222 is deleted, and the second circle 225 having the radius to which the radius of the first circle 222 has been increased is drawn. In addition to this, the intersection point calculation process in Step S108 is performed, so that the intersection points with the triangle 219 and the sine curve 231 are updated. That is, coordinates of a ninth intersection point 246 and a tenth intersection point 247 each of which is an intersection point of the second circle 225 and the triangle 219 are calculated, and as indicated by "248", the displayed position of the intersection point E is changed, and its coordinates are updated to the calculated coordinates (xe2, ye2), and also as indicated by "249", the displayed position of the intersection point F is changed, and its coordinates are updated to the calculated coordinates (xf2, yf2). Also, coordinates of an 11$^{th}$ intersection point 256 and a 12$^{th}$ intersection point 257 each of which is an intersection point of the second circle 225 and the sine curve 231 are calculated, and as indicated by "258", the displayed position of the intersection point G is changed, and its coordinates are updated to the calculated coordinates (xg2, yg2), and also as indicated by "259", the displayed position of the intersection point H is changed, and its coordinates are updated to the calculated coordinates (xh2, yh2).

As described above, in the system 1 of the embodiment, relatively complicated arithmetic operations are executed by the arithmetic server 30 locating behind the web server 20. The information sent from the electronic apparatus 10 is relevant data which includes a function(s), a coefficient(s), a constant (s), a coordinate area(s), and/or various settings, and the information received by the electronic apparatus 10 is drawing data which includes coordinate data indicating coordinates of drawing points. The relevant data may include identification (ID) data identifying to which figure the relevant data is relevant, and the drawing data may include ID data which agrees with the ID data of the relevant data. The system 1 thus configured enables complicated arithmetic operations. Further, because the electronic apparatus 10 does not need to execute complicated operations or actions, a load of processing performed by the electronic apparatus 10 is reduced. Further, processing performed by the arithmetic server 30 is concealed.

Meanwhile, if all the arithmetic operations are executed by the arithmetic server 30, time required for communications between the electronic apparatus 10 and the arithmetic server 30 becomes long. For example, prospect of frequently and repeatedly performing a process of drawing a plurality of geometric figures, and moving or transforming the figures while displaying intersection point(s) of the figures rises a problem of length of communication time. According to the configuration of the embodiment, relatively-low/light-load simple arithmetic operations are executed by the electronic apparatus 10, and relatively-high/heavy-load complicated arithmetic operations are executed by the arithmetic server 30. Such division of the actions reduces processing time and speeds up processing as the whole system. Further, a load of the server, which many electronic apparatuses access, is reduced.

In the above embodiment, linear functions and functions for conic sections are prepared in the program(s) which runs on the electronic apparatus 10. However, this is not intended to limit the present invention. Functions prepared in the electronic apparatus 10 may be any function as far as they can be processed/executed by the electronic apparatus 10. Further, functions for drawing graphs may not be prepared in the electronic apparatus 10. In this case, the electronic apparatus 10 uses coordinates calculated by the arithmetic server 30 when drawing graphs, and uses coordinates identified by/in itself when drawing geometric figures.

In the above embodiment, drawing figures, modifying the figures, and obtaining intersection points of the figures have been described. However, some of these may be omitted, or other processes may be added. For example, a process for obtaining distance between a point on a figure and a point on another figure, a process for obtaining length(s) of figure(s), a process for obtaining slope (s) of figure (s), and so forth may be performed. In these cases too, which one of the electronic apparatus 10 and the arithmetic server 30 executes an arithmetic operation(s) is determined according to the function(s) for the figure(s).

The programs which run on the electronic apparatus 10 may be described with JavaScript®. The electronic apparatus 10 and the web server 20 may send and receive information with one another via HTTP protocol. The information to be sent/received therebetween may be REST JSON data, and may be sent/received via HTTP POST/GET.

In the above embodiment, applications for mathematics education are cited as examples. However, this is not intended to limit the present invention. The above technology is applicable to applications for various types of education. Further, the technology is applicable to various applications not only for education but also, for example, for analysis, in particular, applications in the fields of mathematics, physics, chemistry, other science, and engineering.

The present invention is not limited to the above embodiment (s), and can be variously modified in the practical phase without departing from the scope of the present invention. Further, the embodiments may be appropriately combined and implemented. In this case, combined effects are obtained. Still further, the embodiments include various inventions which can be extracted by, from disclosed elements, selecting some of the disclosed elements and combining the same. For example, even if some elements are removed from all the elements disclosed in the embodiment(s), a configuration made by removing the elements can be extracted as an invention as far as it can achieve at least one object and obtain at least one effect.

What is claimed is:

1. An electronic apparatus which communicates with at least one server, comprising:
   a memory which stores in advance function data for figure drawing, the function data including a plurality of functions, wherein each of the plurality of functions is expressible as a figure on a graph by plotting coordinate points on the graph based on the function and based on a value inserted in the function in accordance with a user operation;
   a display; and
   a processor which:
   obtains an instruction on a figure-related process to draw a figure;
   if a type of the figure indicated by the obtained instruction is a type that is not expressible by any of the functions included in the function data stored in advance in the memory, (i) sends relevant data including information on the figure to the at least one server, (ii) receives, from the at least one server, drawing data generated by the at least one server executing, based on the relevant data, an arithmetic operation required for the figure-related process, and (iii) performs the figure-related process on the display in accordance with the received drawing data without executing the arithmetic operation required for the figure-related process using the function data; and
   if the type of the figure indicated by the obtained instruction is a type that is expressible by one of the plurality of functions included in the function data stored in advance in the memory, (i) executes an arithmetic operation required for the figure-related process using the function data without requesting the at least one server to execute the arithmetic operation required for the figure-related process, and (ii) performs the figure-related process on the display in accordance with drawing data generated as a result of the arithmetic operation,
   wherein:
   the relevant data sent by the processor to the at least one server includes identification data identifying to which figure the relevant data is relevant, and
   the drawing data received by the processor from the at least one server agrees with the identification data included in the relevant data.

2. The electronic apparatus according to claim 1, wherein:
   the drawing data received by the processor from the at least one server includes identification data which agrees with the identification data included in the relevant data.

3. An electronic apparatus which communicates with at least one server, comprising:
   a memory which stores in advance function data for figure drawing, the function data including a plurality of functions, wherein each of the plurality of functions is expressible as a figure on a graph by plotting coordinate points on the graph based on the function and based on a value inserted in the function in accordance with a user operation;
   a display; and
   a processor which:
   obtains an instruction on a figure-related process to draw a figure;
   if a type of the figure indicated by the obtained instruction is a type that is not expressible by any of the functions included in the function data stored in advance in the memory, (i) sends relevant data including information on the figure to the at least one server, (ii) receives, from the at least one server, drawing data generated by the at least one server executing, based on the relevant data, an arithmetic operation required for the figure-related process, and (iii) performs the figure-related process on the display in accordance with the received drawing data without executing the arithmetic operation required for the figure-related process using the function data; and
   if the type of the figure indicated by the obtained instruction is a type that is expressible by one of the plurality of functions included in the function data stored in advance in the memory, (i) executes an arithmetic operation required for the figure-related process using the function data without requesting the at least one server to execute the arithmetic operation required for the figure-related process, and (ii) performs the figure-related process on the display in accordance with drawing data generated as a result of the arithmetic operation,
   wherein the processor displays, on the display, a first frame to draw the figure, a second frame to input a mathematical expression expressing the figure, and a line which connects the first frame and the second frame.

4. An information processing method for an electronic apparatus including a memory which stores in advance function data for figure drawing, the function data including a plurality of functions, wherein each of the plurality of functions is expressible as a figure on a graph by plotting coordinate points on the graph based on the function and based on a value inserted in the function in accordance with a user operation, the method comprising:
   obtaining an instruction on a figure-related process to draw a figure;
   if a type of the figure indicated by the obtained instruction is a type that is not expressible by any of the functions included in the function data stored in advance in the memory of the electronic apparatus, (i) sending relevant data including information on the figure to at least one server, (ii) receiving, from the at least one server, drawing data generated by the at least one server executing, based on the relevant data, an arithmetic operation required for the figure-related process, and (iii) performing the figure-related process on a display of the electronic apparatus in accordance with the received drawing data without executing the arithmetic operation required for the figure-related process using the function data; and if the type of the figure indicated by the obtained instruction is a type that is expressible by one of the plurality of functions included in the function data stored in advance in the memory, (i) executing an arithmetic operation required for the figure-related process using the function data without requesting the at least one server to execute the arithmetic operation required for the figure-related process, and (ii) performing the figure-related process on the display in accordance with drawing data generated as a result of the arithmetic operation, wherein:

the relevant data sent to the at least one server includes identification data identifying to which figure the relevant data is relevant, and the drawing data received from the at least one server agrees with the identification data included in the relevant data.

5. The information processing method according to claim 4, wherein the figure-related process includes generating the drawing data indicating coordinates of a drawing point for drawing the figure.

6. The information processing method according to claim 4, wherein the figure-related process includes generating the drawing data indicating coordinates of a drawing point for modifying the figure which has been drawn.

7. The information processing method according to claim 4, wherein the figure-related process includes generating the drawing data indicating coordinates of an intersection point of the figure and another figure which have been drawn.

8. The information processing method according to claim 4, wherein the function data stored in advance in the memory includes at least one of (i) at least one linear function and (ii) at least one function for a conic section.

9. The information processing method according to claim 4, further comprising determining whether or not the type of the figure indicated by the obtained instruction is the type that is expressible by one of the plurality of functions included in the function data stored in the memory.

10. The information processing method according to claim 4, wherein the drawing data includes coordinates of a drawing point for the figure or coordinates of an intersection point of the figure and another figure.

11. The information processing method according to claim 4, wherein:

the drawing data received from the at least one server includes identification data which agrees with the identification data included in the relevant data.

12. An information processing method for an electronic apparatus including a memory which stores in advance function data for figure drawing, the function data including a plurality of functions, wherein each of the plurality of functions is expressible as a figure on a graph by plotting coordinate points on the graph based on the function and based on a value inserted in the function in accordance with a user operation, the method comprising:

obtaining an instruction on a figure-related process to draw a figure;

if a type of the figure indicated by the obtained instruction is a type that is not expressible by any of the functions included in the function data stored in advance in the memory of the electronic apparatus, (i) sending relevant data including information on the figure to at least one server, (ii) receiving, from the at least one server, drawing data generated by the at least one server executing, based on the relevant data, an arithmetic operation required for the figure-related process, and (iii) performing the figure-related process on a display of the electronic apparatus in accordance with the received drawing data without executing the arithmetic operation required for the figure-related process using the function data;

if the type of the figure indicated by the obtained instruction is a type that is expressible by one of the plurality of functions included in the function data stored in advance in the memory, (i) executing an arithmetic operation required for the figure-related process using the function data without requesting the at least one server to execute the arithmetic operation required for the figure-related process, and (ii) performing the figure-related process on the display in accordance with drawing data generated as a result of the arithmetic operation; and displaying, on the display, a first frame to draw the figure, a second frame to input a mathematical expression expressing the figure, and a line which connects the first frame and the second frame.

13. The information processing method according to claim 12, wherein the figure-related process includes generating the drawing data indicating coordinates of a drawing point for drawing the figure.

14. The information processing method according to claim 12, wherein the figure-related process includes generating the drawing data indicating coordinates of a drawing point for modifying the figure which has been drawn.

15. The information processing method according to claim 12, wherein the figure-related process includes generating the drawing data indicating coordinates of an intersection point of the figure and another figure which have been drawn.

16. The information processing method according to claim 12, wherein the function data stored in advance in the memory includes at least one of (i) at least one linear function and (ii) at least one function for a conic section.

17. The information processing method according to claim 12, further comprising determining whether or not the type of the figure indicated by the obtained instruction is the type that is expressible by one of the plurality of functions included in the function data stored in the memory.

18. A non-transitory computer-readable recording medium storing a program of a system, wherein the program is executable by a computer to cause an electronic apparatus to:

obtain an instruction on a figure-related process to draw a figure;

if a type of the figure indicated by the obtained instruction is a type that is not expressible by any of functions included in function data stored in advance in a memory of the electronic apparatus, wherein each of the plurality of functions included in the function data stored in advance in the memory is expressible as a figure on a graph by plotting coordinate points on the graph based on the function and based on a value inserted in the function in accordance with a user operation, (i) send relevant data including information on the figure to at least one server, (ii) receive, from the at least one server, drawing data generated by the at least one server executing, based on the relevant data, an arithmetic operation required for the figure-related process, and (iii) perform the figure-related process on a display of the electronic apparatus in accordance with the received drawing data without executing the arithmetic operation required for the figure-related process using the function data; and if the type of the figure indicated by the obtained instruction is a type that is expressible by one of the plurality of functions included in the function data stored in advance in the memory, (i) execute an arithmetic operation required for the figure-related process using the function data without requesting the at least one server to execute the arithmetic operation required for the figure-related process, and (ii) perform the figure-related process on the display in accordance with drawing data generated as a result of the arithmetic operation, wherein:

the relevant data sent to the at least one server includes identification data identifying to which figure the relevant data is relevant, and the drawing data received from the at least one server agrees with the identification data included in the relevant data.

19. The non-transitory computer-readable recording medium according to claim 18, wherein:

the drawing data received from the at least one server includes identification data which agrees with the identification data included in the relevant data.

20. A non-transitory computer-readable recording medium storing a program of a system, wherein the program is executable by a computer to cause an electronic apparatus to:

obtain an instruction on a figure-related process to draw a figure;

if a type of the figure indicated by the obtained instruction is a type that is not expressible by any of functions included in function data stored in advance in a memory of the electronic apparatus, wherein each of the plurality of functions included in the function data stored in advance in the memory is expressible as a figure on a graph by plotting coordinate points on the graph based on the function and based on a value inserted in the function in accordance with a user operation, (i) send relevant data including information on the figure to at least one server, (ii) receive, from the at least one server, drawing data generated by the at least one server executing, based on the relevant data, an arithmetic operation required for the figure-related process, and (iii) perform the figure-related process on a display of the electronic apparatus in accordance with the received drawing data without executing the arithmetic operation required for the figure-related process using the function data; and if the type of the figure indicated by the obtained instruction is a type that is expressible by one of the plurality of functions included in the function data stored in advance in the memory, (i) execute an arithmetic operation required for the figure-related process using the function data without requesting the at least one server to execute the arithmetic operation required for the figure-related process, and (ii) perform the figure-related process on the display in accordance with drawing data generated as a result of the arithmetic operation; and display, on the display, a first frame to draw the figure, a second frame to input a mathematical expression expressing the figure, and a line which connects the first frame and the second frame.

* * * * *